(12) United States Patent
Fiebelkorn et al.

(10) Patent No.: US 10,326,918 B2
(45) Date of Patent: Jun. 18, 2019

(54) HEAD-UNIT AND SYSTEM FOR INTERACTIVE TRANSMISSION OF VIDEO AND AUDIO SIGNALS

(71) Applicant: EAYSE GMBH, Eichwalde (DE)

(72) Inventors: Richard Fiebelkorn, Wildau (DE);
Ralf Vandenhouten, Teltow (DE);
Andrea Funke, Eichwalde (DE); Hans Peter Constin, Berlin (DE)

(73) Assignee: EAYSE GMBH, Eichwalde (DE)

( * ) Notice: Subject to any disclaimer, the term of this patent is extended or adjusted under 35 U.S.C. 154(b) by 0 days.

(21) Appl. No.: 15/756,079

(22) PCT Filed: Aug. 31, 2016

(86) PCT No.: PCT/EP2016/070554
§ 371 (c)(1),
(2) Date: Feb. 28, 2018

(87) PCT Pub. No.: WO2017/037140
PCT Pub. Date: Mar. 9, 2017

(65) Prior Publication Data
US 2018/0249048 A1      Aug. 30, 2018

(30) Foreign Application Priority Data
Aug. 31, 2015   (EP) .................................... 15183212

(51) Int. Cl.
*H04N 5/225*        (2006.01)
*H04N 5/247*        (2006.01)
(Continued)

(52) U.S. Cl.
CPC ......... *H04N 5/2251* (2013.01); *G02B 27/017* (2013.01); *G02B 27/0172* (2013.01);
(Continued)

(58) Field of Classification Search
CPC .... H04N 5/2251; H04N 5/247; H04N 13/194; H04N 13/239; H04N 21/233;
(Continued)

(56) References Cited

U.S. PATENT DOCUMENTS 5,610,678 A * 3/1997 Tsuboi .................. G03B 13/02
396/373
5,971,538 A   10/1999 Heffner
(Continued)

FOREIGN PATENT DOCUMENTS

| JP | 2010050645 | 3/2010 |
| WO | 2011024134 | 3/2011 |
| WO | 2014191460 A1 | 12/2014 |

*Primary Examiner* — Marly S Camargo
(74) *Attorney, Agent, or Firm* — JMB Davis Ben-David (57) ABSTRACT

The invention relates to a device (1) for recording and transmitting image and audio data, comprising: a head mounting (1a), wherein the head mounting (1a) comprises a forehead portion (2), a first side portion (3) and a second side portion (4), wherein the head mounting (1a) is adapted and configured to be mounted on a human head (100), so as to be stabilized on at least three points (5, 6, 7) on the human head (100), wherein a first point (5) among the at least three points (5, 6, 7) is arranged on the first side portion (3), a second point (6) among the at least three point (5, 6, 7) is arranged on the second side portion (4), and a third point (7) among the at least three points (5, 6, 7) is arranged on the forehead portion (2) of the head mounting (1a); a first camera (8) and a second camera (9) that are arranged on the forehead portion (2) of the head mounting (1a) at a predefined distance (10) along a horizontal extension direction (11) of the forehead portion (2); wherein the forehead portion (2), in a state according to the invention, is arranged on the head (100) in such a manner that in the region (101) of the eyes (103) the end portion (2) is arranged horizontally and above the eyes (103), wherein, the forehead portion (2)
(Continued)

comprises a supporting bridge (14) that is adjustable in length, wherein the supporting bridge (14) is arranged centrally at a lower edge of the forehead portion (2), and wherein the supporting bridge (14) is configured to adjust the height of the forehead portion (2) over the eyes (103) of a person, when the device (1) is worn on the head (100) according to the invention, wherein the third point (7) lies on the supporting bridge (14).

14 Claims, 5 Drawing Sheets (51) Int. Cl.

| | | |
|---|---|---|
| *H04N 13/194* | (2018.01) | |
| *G02B 27/01* | (2006.01) | |
| *G03B 17/56* | (2006.01) | |
| *G06F 3/01* | (2006.01) | |
| *H04N 13/239* | (2018.01) | |
| *H04N 21/233* | (2011.01) | |
| *H04N 21/234* | (2011.01) | |

(52) U.S. Cl.
CPC ....... *G02B 27/0176* (2013.01); *G03B 17/561* (2013.01); *G06F 3/011* (2013.01); *H04N 5/247* (2013.01); *H04N 13/194* (2018.05); *H04N 13/239* (2018.05); *H04N 21/233* (2013.01); *H04N 21/234* (2013.01); *G02B 2027/0132* (2013.01); *G02B 2027/0138* (2013.01); *G02B 2027/0154* (2013.01); *G03B 2206/00* (2013.01)

(58) Field of Classification Search
CPC ................ H04N 21/234; G02B 27/017; G02B 27/0172; G02B 27/0176; G03B 17/561; G03B 13/20; G06F 3/011
USPC ..... 348/207.99, 61, 78, 211.99–211.11, 262, 348/333.01, 333.03; 396/51, 325, 333, 396/419, 420, 423, 426, 329, 322, 296; 345/633, 7, 8, 156
See application file for complete search history.

(56) References Cited

U.S. PATENT DOCUMENTS

| | | | |
|---|---|---|---|
| 7,800,650 B1* | 9/2010 | Prieto ................... | H04N 5/225 348/207.99 |
| 2007/0201847 A1 | 8/2007 | Lei | |
| 2010/0157433 A1* | 6/2010 | Mukawa ............... | G02B 27/01 359/630 |
| 2012/0280893 A1 | 11/2012 | Holakovszky | |
| 2012/0314045 A1* | 12/2012 | Billard .................... | H04N 7/18 348/78 |
| 2013/0004402 A1* | 2/2013 | Olsson .................... | G09G 5/00 345/8 |
| 2013/0235331 A1 | 9/2013 | Heinrich et al. | |
| 2014/0160248 A1* | 6/2014 | Pomerantz ............ | H04N 13/02 348/47 |
| 2014/0160250 A1 | 6/2014 | Pomerantz et al. | |
| 2014/0267615 A1 | 9/2014 | Tapia et al. | |

* cited by examiner

HEAD-UNIT AND SYSTEM FOR INTERACTIVE TRANSMISSION OF VIDEO AND AUDIO SIGNALS

CROSS-REFERENCE TO RELATED APPLICATIONS

This is the U.S. National Stage of International Application No. PCT/EP2016/070554 filed Aug. 31, 2016, which was published in German under PCT Article 21(2), and which in turn claims the benefit of European Patent Application No. 15183212.8 filed Aug. 31, 2015.

DESCRIPTION

The invention relates to a device mountable on the head of a person for recoding and transmission of image and audio data according to claim 1, as well as to a system for interactive communication with the device, in accordance with claim 13.

Online services like Skype, Hangouts or Facetime, which transmit video and audio data over a data-network, allow for image-supported telephonic conversations. Particularly, these services enable an interactive exchange of information between a sender, such as an on-site transmitter, and a remote receiver.

In many situations, the sender should be able to move and act freely, whereby the viewing angle of the sender should preferably always be transmitted as image data, so that the receiver sees the same as the sender does.

However, the above mentioned services send and receive the image data in restricted quality, namely as a two-dimensional video stream and with a reduced band-width.

A realistic representation of the events on-site cannot be guaranteed as such. In any case, it can be problematic to realistically depict the situation on-site with a two-dimensional image data set, due to the lack of three-dimensional information.

Currently, presentations are particularly offered in the form of photos or videos, for example, for depicting a view of an apartment or a house over the internet.

The degree of reprocessing or falsification of the imagery is not apparent for the viewer. For example, the impression of the hotel rooms on the booking portals is always distorted by photo selection or post-processing.

Although there are already cameras and systems for recording and reproducing three-dimensional image data, these systems restrict the sender in terms of his range of action, and it is not yet possible to transmit a three-dimensional video stream in close-to-real-time using these systems, let aside the possibility for the receiver to interact with the sender.

Alternatives exist only in the form of devices that are dedicatedly designed for a two-dimensional image-data transfer, such as, attachable Camera-glasses "Google Glass". For Google Glass, however, there is no comprehensive service for connection management between the sender and the receiver. Google Glass can be linked via Bluetooth or WLAN to a mobile communication device, and can be used to transmit data directly over the link when the receiver is known, and is directly dialed or addressed to.

Further, every eyeglass solution has a restricted field of view for sender.

Until now there is no solution, which incorporates the following characteristics and functional features:
No physical constraint on the sender side;
Interaction possibility between the sender and the receiver in the form of image and sound transmission
Communication management (Connection control, customer management, transcoding, provision of additional information, etc.) over a central server.

Therefore, the purpose of the invention is to provide a device, with which a realistic presentation of objects or conditions on-site can be achieved, wherein the device should be further configured to generate three-dimensional image data sequences, as well as to permit a real-time interaction with a receiver, and not to restrict the carrier of the device in his/her radius of action.

The problem according to the invention is solved with a mountable device for recording and transmission of image and audio data according to claim 1, as well as with a system for interactive communication with the device, according to claim 13. Advantageous embodiments of the invention are provided in dependent claims and are described in detail hereinafter.

Accordingly, it is provided that the device for recording and transmitting image and audio data comprises at least the following components:

a head mounting, the head mounting comprising a forehead portion, a first side portion and a second side portion, the head mounting being configured and adapted to be mounted on a human head in such a way that it is supported at least on three points on the head, wherein a first of the at least three points is arranged on the first side portion, a second of the three points is arranged on the second side portion and a third of the at least three points is arranged on the forehead portion of the head mounting, a first camera and a second camera that are arranged at a pre-defined distance along a horizontal extension direction on the forehead portion of the head mounting, when the device is mounted on the head in accordance with the invention, and wherein, in the region of the eyes, the head mounting is arranged at least partially, particularly completely above the eyes, and particularly above the eyebrows or at the level with the eyebrows and wherein, the forehead portion is arranged horizontally, and particularly parallel to the eyes, wherein particularly the first camera and the second camera are arranged along the horizontal extension direction plumb above the eyes.

In an alternative formulation that can be used in a complementary or exclusive manner for claiming the device, the problem according to the invention is solved by means of a device for recording and transmitting image and audio data, comprising:

a head mounting, wherein the head mounting comprises a forehead portion, a first side portion and a second side portion, the head mounting being configured and adapted to be mounted on a human head in such a way that it is stabilized at least three points on the head, wherein a first of the at least three points is arranged on the first side portion, a second of the at least three points is arranged on the second side portion and a third of the at least three points is arranged on the forehead portion of the head mounting, a first camera and a second camera that are arranged on the forehead portion of the head mounting at a pre-defined distance along a horizontal extension direction (11) of the forehead portion, wherein in the state according to the invention the head mounting is mounted on the head in such a manner that, in in the region of the eyes, the forehead portion is arranged horizontally and above the eyes.

Regardless of the formulation, the following applies to both formulations.

The head mounting can also comprise or can be a headband or even have stiff, stabilizing components.

The device according to the invention allows to be worn by a person on his or her head, without restricting the radius of action. Furthermore, it is also possible for the person to simultaneously wear glasses, without the device interfering significantly with wearing of the glasses. This particularly means that the device does not have any components in the region of the eyes, which lie in the field of view of the person. Particularly the nose is not considered as a part of the eye region.

By means of the first and second camera and their specific arrangement, it becomes possible to record a three-dimensional image or a three-dimensional image sequence corresponding to at least a part of a person's field of view, so that the local conditions in the person's field of view can be captured by image data. In the current context, image data also includes video data.

Particularly the first and second cameras are digital cameras that record and output digital image data.

By means of the device in accordance with the invention, the hands of a person carrying the device on the head are not tied to holding or aligning the device, but can interact with the environment as usual.

The first and second side portions of the head mounting extend on the sides of the head, in the direction of the ears, when the device is worn on the head in accordance with the invention.

The head mounting can be made of known materials such as polymers, metal or can at least contain these materials.

The side portions of the head mounting form the arms of the particularly u-shaped head mounting, wherein the forehead portion connects both the side portions.

The head mounting can be formed in one piece from a production material or it can also be composed of, or assembled using different segments.

The at least three points at which the head mounting is supportable on the human head, are used to ensure that the device is comfortable on one hand, and on the other hand, can be worn on a person's head without sliding down, especially also when the person is tilting the head.

It is noted that the third of the at least three points may be located completely below the eyebrows. However, its supporting function is then transferred to the forehead portion, running above the eyebrows, for example, through a supporting bridge.

The device according to the invention particularly allows that a part of the forehead portion runs underneath the eyebrows, wherein this portion does particularly not lie above the region of the eyes but instead lies in the area of the nose.

In the state according to the invention, the first and second camera are arranged above or at the level of the eyebrows.

According to an embodiment of the invention, the forehead portion of the device lies completely outside, particularly above the field of view or the field of vision of the person, when the device is worn on the head according to the invention.

The field of view is given by the solid angle that the person can capture with the eyes without moving the head.

This is particularly advantageous as the person's field of view is not restricted and therefore the device does not interfere with the person.

The areas of application of the device include, for example, presentations, such as for training purposes, demonstrations via the Internet, representation at events, only to name a few among the entire range of applications.

In another embodiment of the invention, it is envisioned that the first camera and the second camera are each arranged directly particularly vertically above the person's eye, when the device is worn on the head according to the invention.

This arrangement is advantageous as three-dimensional images or image sequences, for example, are calculated from the image data of the first and second camera. In order to create a naturally appearing 3D-effect, the cameras should preferably be arranged at eye distance, which is provided by the arrangement according to the invention.

According to another embodiment of the invention, the first camera and the second camera are arranged at a predefined distance of 5 cm to 8 cm, preferably at a predefined distance of 6 cm to 7 cm, in particular at a predefined distance of 6.3 cm.

This distance is particularly advantageous for the generation of natural-appearing three-dimensional image data, which are generated from two image data sets of the first and second camera.

The distance of 6.3 cm corresponds to the average eye distance in humans.

In another embodiment of the invention, it is provided that the first camera and the second camera each have an optical axis, wherein the optical axes of the cameras include an angle of less than 10° in magnitude in the horizontal plane, wherein the optical axes of the first and the second camera run preferably parallel to each other.

The optical axes of the first and second camera extend particularly vertically parallel-shifted along the optical axes of the eyes.

There are different methods for generation of three-dimensional images or image sequences, wherein in one method the optical axes of the cameras basically run parallel, wherein in another method for the production of three-dimensional images the position of objects with respect to the screen plane of the three-dimensional image is predetermined by the angle of the cameras.

Both the methods are advantageously applicable for the invention.

According to another embodiment of the invention, it is provided that the first side portion and the second side portion are shaped as glasses frames, and the first and second points of the head mounting lie above and/or behind the person's ears, when the device is worn on the head according to the invention.

This embodiment is advantageous, as it provides a particularly high wearing stability to the device and makes the device more stable when mounted on a person's head.

In an advantageous embodiment of the invention, the first and the second side portions each touch the head behind the ear with a rear section of the respective side portion, wherein each of the respective rear portions comprises of a padding, and wherein each padding preferably lies on a transition from the skull to the neck muscles.

This embodiment advantageously combines an increased carrying stability with an increased wearing comfort. This is particularly advantageous because the device according to the invention is heavier than conventional glasses.

For example, the padding ensures an increased carrying stability for the device. The padding can be made of foam or other soft material.

According to a further preferred embodiment of the invention, the third point of the head mounting lies on the base of the nasal bone, when the device is mounted on the head according to the invention.

Particularly when the device is used in accordance with the invention, the third point rests on the nasal bone in such a manner that it lies above an eyeglass nasal frame of glasses, for example if the glasses are worn simultaneously with the device. In this embodiment, the third point particularly does not interfere with glasses potentially worn at the same time.

In a further embodiment of the invention, the forehead portion comprises a supporting bridge that is adjustable in length, wherein the supporting bridge is arranged or formed centrally at a lower edge of the forehead portion, and wherein the supporting bridge is arranged and configured to adjust the height of the forehead portion above the eyes of a person, when the device is worn on the head according to the invention, wherein the third point lies on the supporting bridge, and particularly lies at an end of the supporting bridge.

The supporting bridge being adjustable in length can be used in an advantageous way to adjust the position of the device on a person's head, based on the individual's head shape, and in particular, to adjust the height of the forehead portion above the person's eyebrows.

In a further embodiment of the invention, it is provided that the forehead portion and/or the first side portion as well as the second side portion have a triangular or a quadrangular cross-sectional contour, orthogonal to the extension direction of the respective portions of the device.

This cross-sectional contour imparts an additional stiffness to the head mounting, wherein the respective portions of the head mounting can be manufactured solid or hollow.

In a further embodiment of the invention, the device comprises an audio means, which is configured to record and to convert audio signals into audio data, as well as to convert and reproduce audio data into audio signals.

Such an audio means includes, for example, a microphone for recording audio signals, as well as a headphone for playback of audio signals particularly received from a receiver, wherein the receiver can, for example, send instructions or questions to the sender, about the environment in which the sender is located. The audio data are particularly digital data.

In this manner, a telecommunication is ensured between the sender carrying the device, and the receiver.

In a particularly preferable embodiment of the invention, the device comprises a radio means, which is provided and configured to transmit the image data of the first camera and the image data of the second camera, and particularly the audio data of the audio means as electromagnetic radio signals, and in particular for receiving radio signals, particularly the radio signals containing the audio data for the audio means.

This variant of the invention is particularly suitable for ensuring remote data transmission. The radio means is for example an internet connection, e.g. via wireless LAN or a mobile phone connection. The image data of the cameras are particularly preprocessed so that the data volume of the image data is reduced. For this purpose, the device may include a microchip configured therefor, or other suitable means for this purpose. Particularly the radio signals are transmitted in an encrypted form by the radio means, wherein particularly only the receiver possesses the decryption key for the data.

Alternatively, the radio means is configured to directly transmit the video and/audio data over a mobile communication network.

In a further embodiment of the invention, it is envisaged that the device includes a rechargeable battery or a battery.

Thereby the device does not have to draw its energy from a power cable, but is freely movable in terms of spatial location.

In a further preferred embodiment of the invention, it is provided that the device, and particularly the radio means is intended and configured to transmit the image data, and particularly the audio data in real time and, particularly to receive and process the data.

Real-time in this context refers to the device's or the radio means' ability to transmit data with only a short delay, so that the time lag between the actual recording and transmission of the signal particularly amounts to less than one second.

In a preferred embodiment of the invention, the device includes a memory card, which is configured to record the image data of the first and second cameras, and particularly also to record the audio data of the audio means, particularly the received and transmitted audio data.

In a particularly preferred embodiment of the invention, it is provided that the device further includes a SIM-Card, which is configured to send data traffic via a mobile data network of a mobile service provider, wherein the SIM card is arranged in the device, in particular, in such a way as to transmit the image and sound data of the device. SIM is the English abbreviation for "Subscriber Identity Module". A SIM card is, therefore, a chip-card that can be inserted into an electronic device in order to verify the identification of a user on the network. SIM cards are used by mobile service providers to provide mobile data connections to subscribers, i.e. to senders and receivers.

The SIM card can be part of the radio means and is used particularly for the direct transmission of video and/or audio data via a mobile communication network.

In a further embodiment of the invention, it is envisaged that the device comprises a global navigation satellite system module, in particular a GPS-module, a Galileo module and/or a GLONASS module and/or a Bluetooth or WLAN module for near-field localization.

The problem in accordance with the invention is solved by a system for transmission of image data, wherein the system comprises of the following components/modules:
 a device according to the invention;
 a server;
 a client;
wherein the server is adapted and configured to receive, process, and to transmit the radio signals of the device to the client, and wherein the server is further adapted and configured to establish and maintain data communication between the device and the client, and particularly to transmit audio data from the client to the device.

The client in this context is also referred to as the receiver.

This system solves the problem in accordance with the invention in an advantageous manner, as it can link the device with a network of particularly several clients. This can be facilitated via a special data network or even via the Internet, where the data from the device is fed into the network via a data receiver, for example, where it is routed to the server and then forwarded via the network to the client or clients. Alternatively, the device's data can be forwarded directly (i.e. without being first sent over the data network) to a server, which then processes and transmits the data to the client or the clients via the data network.

In a preferred embodiment of the invention, it is provided that the server processes the radio signals of the device into a data stream containing three-dimensional image data.

In a further embodiment of the invention, the transmission bandwidth of the system from the device to the client is configured in such a way that, particularly a sequence of three-dimensional image data comprising at least 20 images per second can be transmitted, wherein the signal from the device to the client is transmitted and decoded particularly in real-time or with a time lag of less than 0.2 seconds.

It is further provided that further information can be shown to the recipient/receiver, such as data sheets. Additionally, in a variant of the invention, virtual objects or backgrounds are additionally blended into the image data, which is also referred to as augmented reality or enhanced reality. In particular, it is provided that the so-called data matrix codes (two-dimensional barcodes) for the configuration and delivery of additional contents (e. g. data sheets) are blended into the image data or their display.

All of the described features that can be combined in a meaningful way can serve as a basis for further claims. This also applies to the following description of the figures.

Further features and advantages of the invention are explained in the following on the basis of the description of the figures and the embodiments. The illustrations include.

Figure 1:
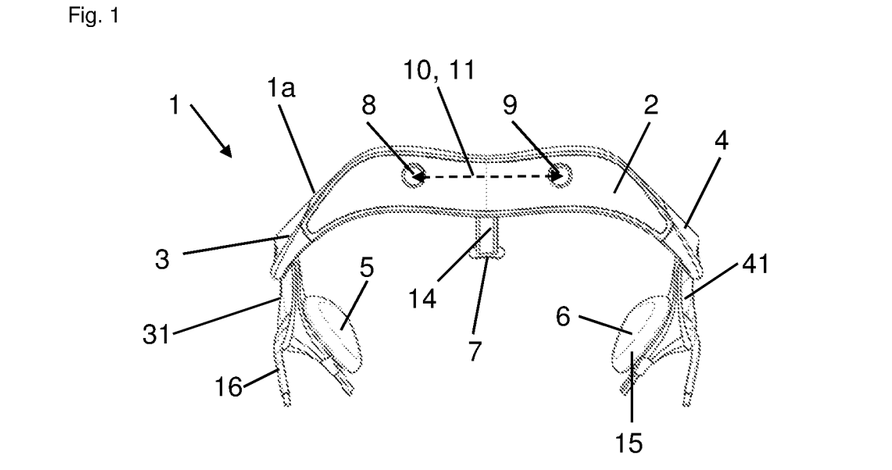
FIG. 1—a front view of the device.
Figure 2:
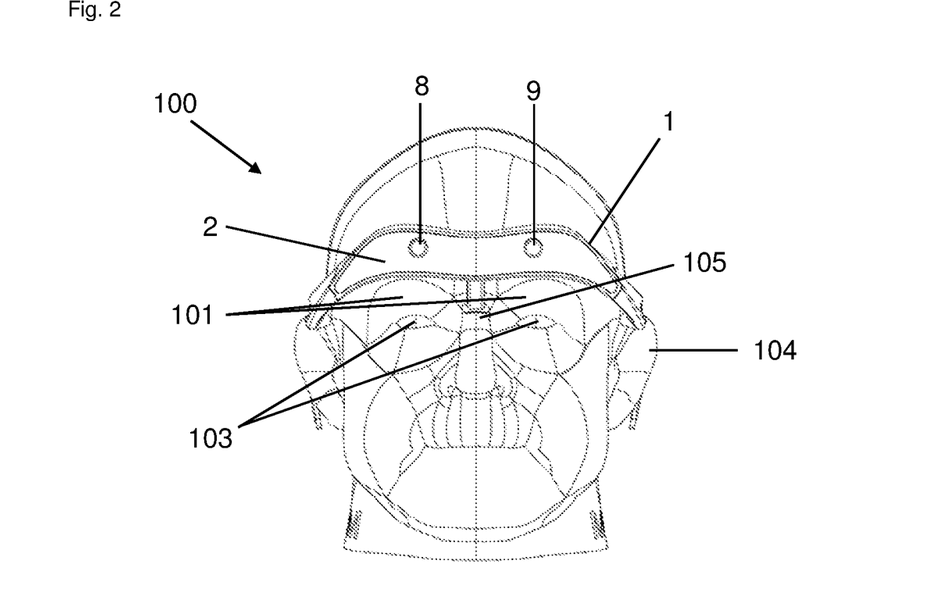
FIG. 2—a front view of the device on the head of a person.

FIG. 1 to FIG. 8 depict a preferred embodiment of the device 1, wherein FIG. 1 and FIG. 2 each depict a front view of the device 1, wherein relative to FIG. 1, FIG. 2 additionally shows how the device 1 is worn on the head 100 of a person according to the invention.

Figure 3:
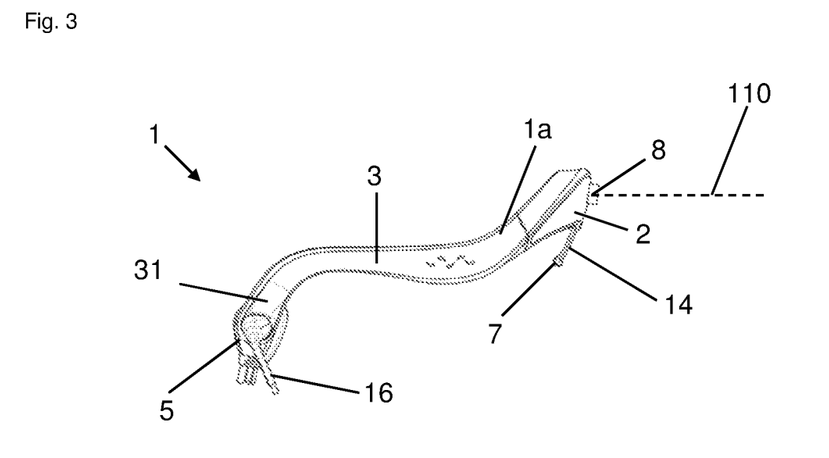
FIG. 3—a side view of the device.
Figure 4:
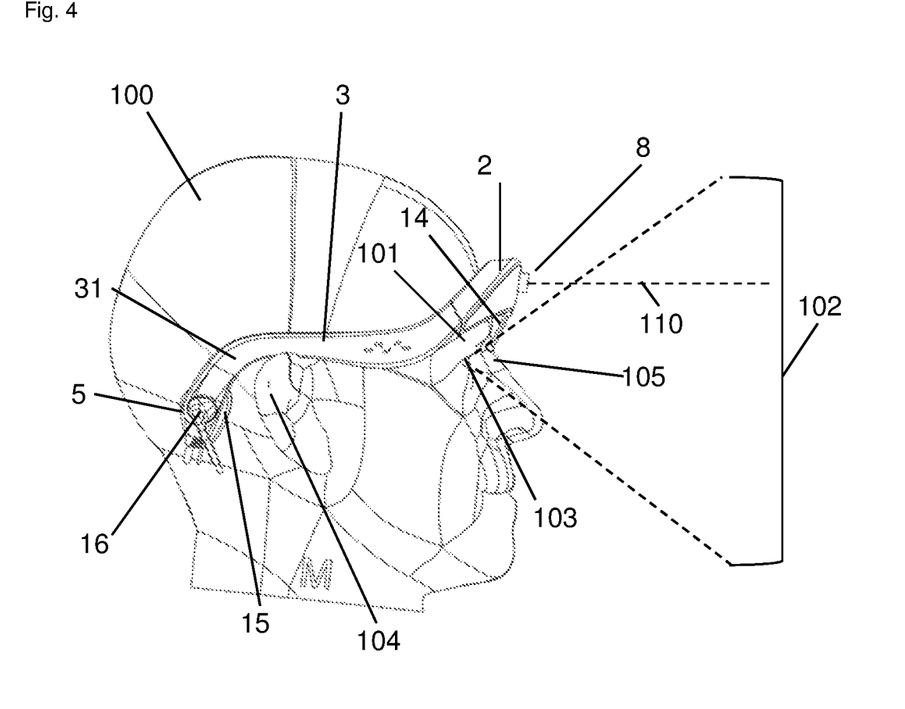
FIG. 4—a side view of the device on the head of a person.

FIG. 3 and FIG. 4 each show a side view of the device 1, wherein FIG. 4 additionally shows how the device 1 is worn on a person's head according to the invention.

Figure 5:
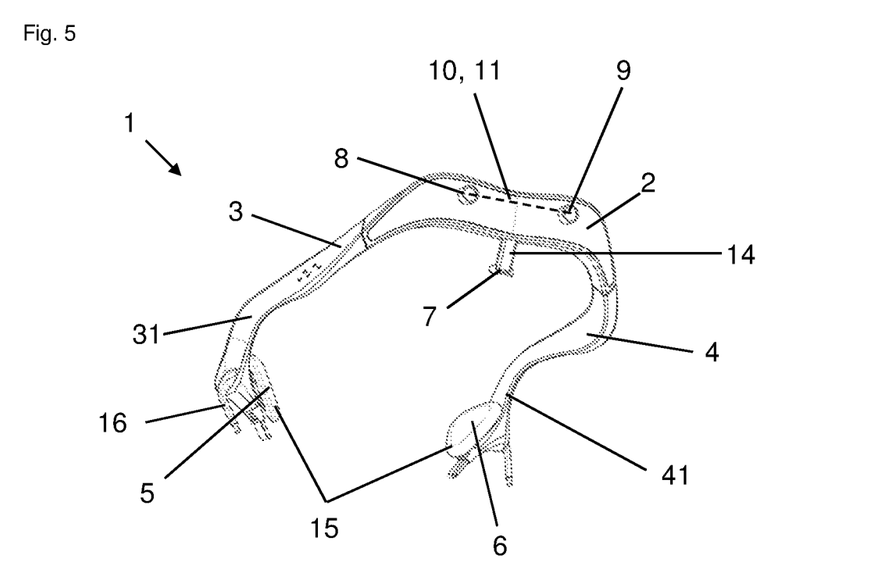
FIG. 5—a perspective front view of the device.
Figure 6:
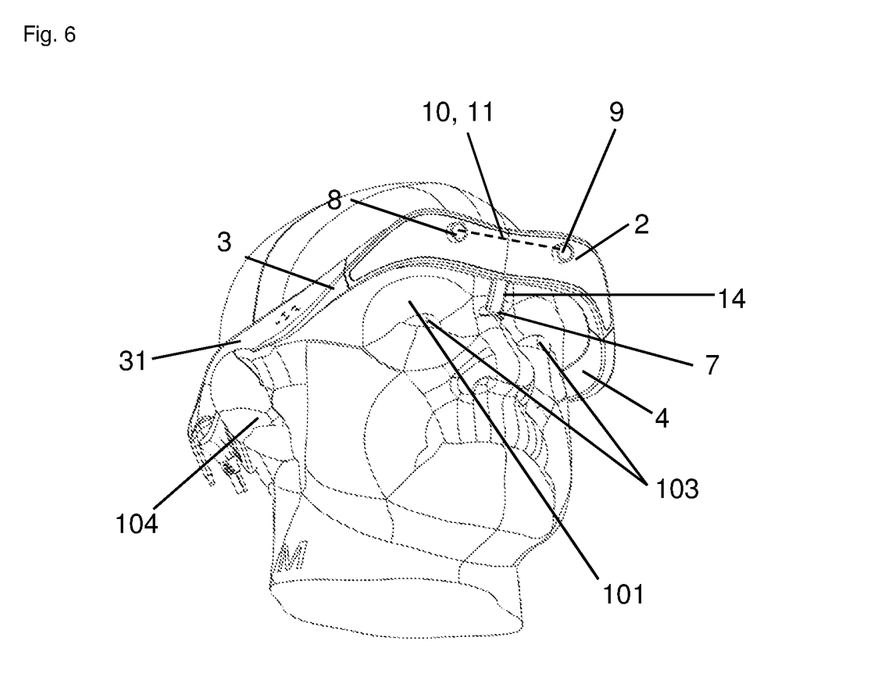
FIG. 6—a perspective front view of the device on the head of a person.

FIG. 5 and FIG. 6 each show a perspective front view of the device 1, wherein FIG. 6 shows in addition to what is shown in FIG. 5, how the device 1 is worn on the head 100 of a person according to the invention.

Figure 7:
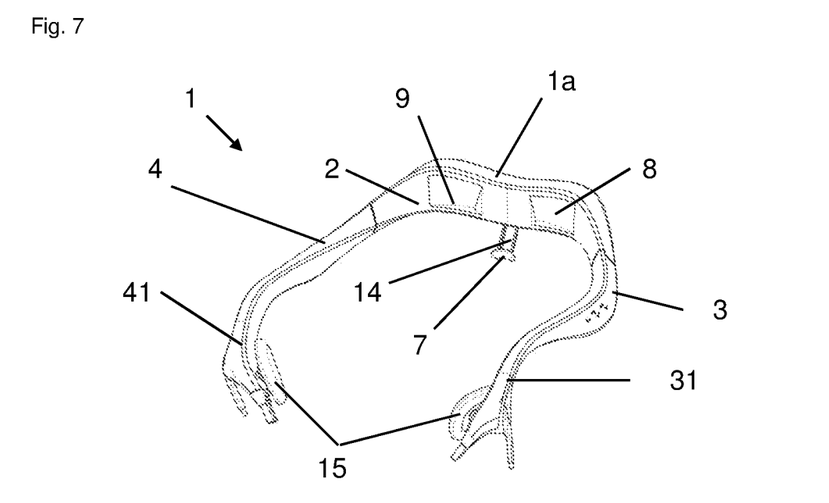
FIG. 7—a perspective rear view of the device.
Figure 8:
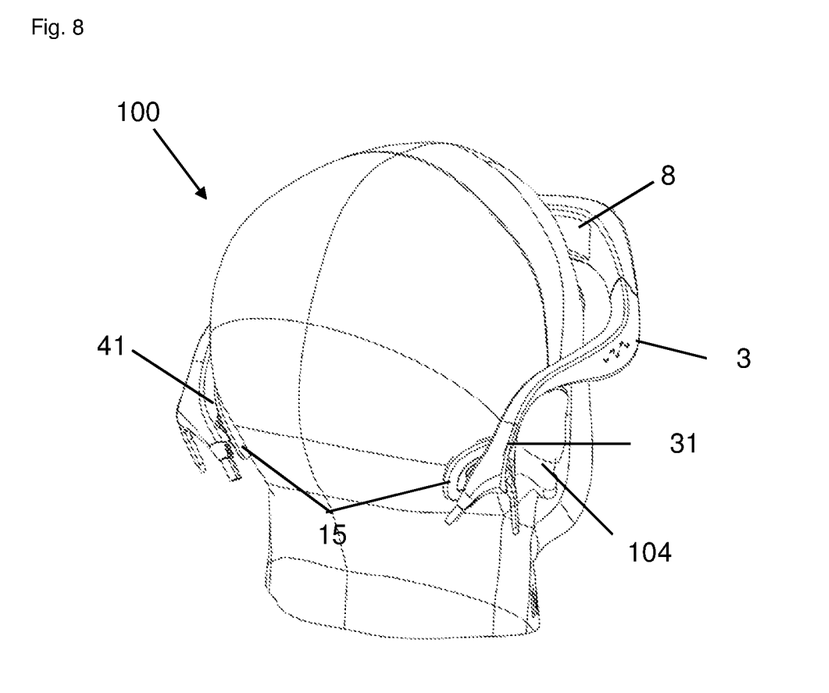
FIG. 8—a perspective rear view of the device on a person's head.

FIG. 7 and FIG. 8 each show a perspective rear view of the device 1, wherein FIG. 8 shows in addition to FIG. 7, how the device 1 is worn on a person's head 100 according to the invention.

The device depicted in FIG. 1 to FIG. 8 comprises a head mounting 1a, comprising a forehead portion 2, as well as a first side portion 3 and a second side portion 4.

The first and second side portions 3, 4 are formed at the ends of the forehead portion 2, whereby the side portions 3, 4 along with the forehead portion 2 form a U-shaped head mounting 1a, similar to glasses. In contrast to glasses, however, the device 1 is configured and arranged that the forehead portion 2 extends above the eyes 103 in a state according to the invention, so that the field of view 102 of the person wearing the device on the head 100 is not restricted.

The forehead portion 2 is shaped as a longitudinally extending band structure, and in contrast to the glasses, it particularly has no transparent areas/regions.

For this purpose, the device 1 comprises at least three points 5, 6, 7 whereon the device 1 is supported on the head 100 of the person. A first point 5 and a second point 6 are each located at one of the side portions 3, 4, respectively, wherein the first and second point 3, 4 are located at the rear section 31, 41 of the first and second side portion 3, 4 respectively, and, similar to glasses, prevent the device 1 from slipping down from the head 100 when the person for example bends or leans forward. A padding 15 is arranged in the region of each of the first and second point 3, 4, which increases the wearing comfort of the device 1. These paddings 15 lie, in particular completely at the rear portion of the head and are arranged at the rear sections 31, 41 of the respective side portion 3, 4.

A third point 7 forms a support region for the forehead portion 2 of the device 1 on the head 100. The three points 5, 6, 7 are selected in such a way that a stable and secure wearing of the device 1 on the head 100 is made possible. For that purpose, the third point 7 is located at one end of a supporting bridge 14, which extends essentially downwards from the forehead portion 7, in order to ensure the supporting of the device 1 at the base of the nasal bone 105, and such that the wearing of device 1 does not interfere with the wearing of conventional spectacles. The supporting bridge 14 is adjustable in length so that the device 1 can be adapted individually to the wearer of the device 1. The height of the forehead portion 2 above the eyes 103 is adjusted with the help of the length-adjustable supporting bridge 14, particularly in the manner that the forehead portion 2 lies above the eyes 103. The supporting bridge 14 includes a forking at the end of the third support point 7, which serves as a saddle for the base of the nasal bone 105.

The forking points at least partially in the direction of the person's face, and not downwards, which ensures a simultaneous wearing of the glasses with the device 1, as the glasses supporting bridge and the supporting bridge 14 of the device 1 do not fit at the same point of the nose.

The device 1 comprises a first digital and a second digital camera 8, 9 that are located and arranged at the forehead portion 2, at an eye distance 10 of the person (preferably 63 mm). The distance 10 is measured over the center of the optics or via the distance of the optical axes 110 of the cameras 8, 9. The cameras 8, 9 point in essentially the same direction so that it is possible to use the image data of the cameras 8, 9 for generating three-dimensional image data.

Further, the cameras 8, 9 are positioned above the eyes 103, on the forehead portion 2, so that only a vertical offset of the cameras 8, 9 with respect to the eyes 103 of the person exists (but no horizontal offset).

The cameras comprise adjusting means that are configured to adjust particularly different angles of the cameras 8, 9 in device 1.

In the rear sections 31, 41 of the side portions 3, 4, the device 1 further comprises headphones 16 as part of an audio means. In the drawing, the headphones 16 are represented only in a holder for headphones 16 on device 1. If required, the headphones 16 can be plugged into the ear so that the audio signals can be transmitted into the ear canal of the person.

Furthermore, device 1 comprises at least a microphone (not shown) that can record audio signals from the person and transmit them to a radio means.

Figure 9:
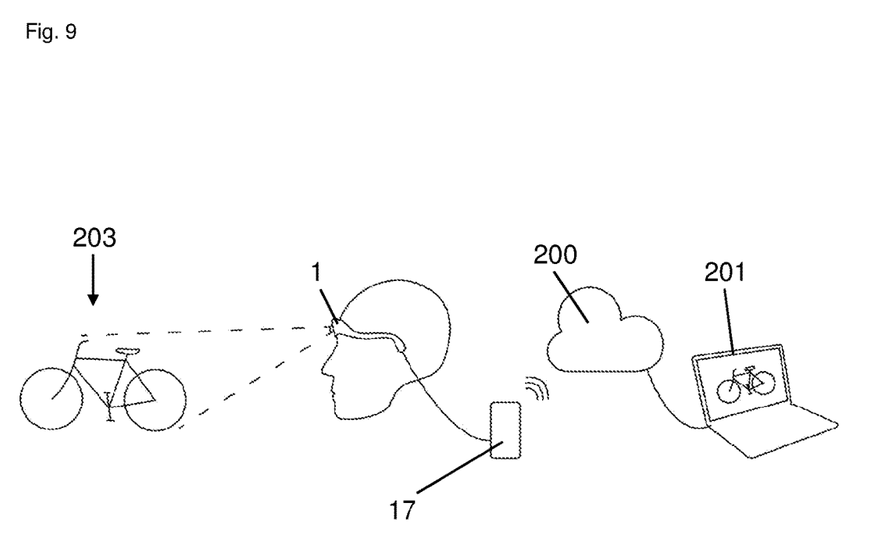
FIG. 9—a system comprising the device, a server and a client.

FIG. 9 depicts a schematic diagram demonstrating how the device 1 in conjunction with a system including a server 200 and client 201, can transmit the events 203 occurring in front of a person, to a receiver.

The device records image data with the first camera 8 and second camera 9, and if necessary, transmits them along with the audio data from the microphone of device 1, to a radio means 17. In this example, the radio means 17 is shown as an external device, but it is also possible without any further prerequisites to integrate the radio means 17 into device 1. The radio means 17 is configured to transmit the image and audio data to the server 200. For this purpose, the audio and image data can be preprocessed according to known encryption and compression techniques. The Server 200 further transmits the received data to the corresponding client 201 that can then generate a three-dimensional image 204 of the conditions at a person's site 203 and, in particular can also play back the audio data. The receiver can thus envision a realistic picture of the conditions at the site 203 of the sender. In particular, the receiver sees in real-time the image detail of the surroundings that also the sender sees. It is also provided that the audio data is transmitted from the receiver via client 201 to the server 200 and from there to device 1. The device 1 plays back this audio data via its headphones 16 so that the sender can listen to the audio data of the receiver.

The invention provides that a realistic representation of the sender's surroundings can be transmitted to a receiver in real-time, in particular in the form of three-dimensional image data and audio data, without impairing the freedom of movement and the field of vision/view of the sender, whereby the sender interacts with the receiver through the bidirectional audio channel.

The invention claimed is:

1. A device (1) for recording and transmitting image and audio data, comprising:
    a head mounting (1a), wherein the head mounting (1a) comprises a forehead portion (2), a first side portion (3) and a second side portion (4), wherein the head mounting (1a) is adapted and configured to be mounted on a human head (100), so as to be stabilized on at least three points (5, 6, 7) on the human head (100), wherein a first point (5) among the at least three points (5, 6, 7) is arranged on the first side portion (3), a second point (6) among the at least three points (5, 6, 7) is arranged on the second side portion (4), and a third point (7) among the at least three points (5, 6, 7) is arranged on the forehead portion (2) of the head mounting (1a);
    a first camera (8) and a second camera (9) that are arranged on the forehead portion (2) of the head mounting (1a) at a predefined distance (10) along a horizontal extension direction (11) of the forehead portion (2);
wherein the forehead portion (2), in a state according to the invention, is arranged on the head (100) in such a manner that in the region (101) of the eyes (103) the end portion (2) is arranged horizontally and above the eyes (103), wherein, the forehead portion (2) comprises a supporting bridge (14) that is adjustable in length, wherein the supporting bridge (14) is arranged centrally at a lower edge of the forehead portion (2), and wherein the supporting bridge (14) is configured to adjust the height of the forehead portion (2) over the eyes (103) of a person, when the device (1) is worn on the head (100) according to the invention, wherein the third point (7) lies on the supporting bridge (14).

2. The device according to claim 1, wherein the forehead portion (2) of the device (1) lies completely outside, in particular above the field of vision (102) of a person, when the device (1) is worn on the head (100) of the person according to the invention and the person looks particularly straight.

3. The device according to claim 1, wherein the first camera (8) and the second camera (9) are each arranged in a vertical extension direction above a respective eye (103) of the person, when the device (1) is worn on the head (100) of the person according to the invention.

4. The device according to claim 1, wherein the first camera (8) and the second camera (9) are arranged at the predefined distance (10) of 5 cm to 8 cm, preferably at the predefined distance (10) of 6 cm to 7 cm, and particularly preferably at the predefined distance (10) of 6.3 cm.

5. The device according to claim 1, wherein the first camera (8) and the second camera (9) each comprise an optical axis (110), wherein the optical axes (110) of the cameras (8, 9) enclose an angle of less than 10° lying in the horizontal plane, wherein the optical axes (110) of the first camera (8) and the second camera (9) extend preferably parallel.

6. The device according to claim 1, wherein the first side portion (3) and second side portion (4) each touch the head behind the ear with a rear portion (31, 41) of the respective side portion (3, 4), wherein each of the respective rear portions (31, 41) particularly comprises of a padding (15), and wherein each padding (15) preferably lies on a transition from the skull to the neck muscles, when the device (1) is worn on the head (100) of a person.

7. The device according to claim 1, wherein the third point (7) of the head mounting rests on the base of the nasal bone (105), when the device (1) is worn on the head (100) according to the invention.

8. The device according to claim 1, wherein the forehead portion (2) and/or the first side portion (3) as well as the second side portion (4) have a triangular or a quadrangular cross-sectional contour orthogonal to the extension direction of the respective portion of the device.

9. The device according to claim 1, wherein the device comprises an audio means configured to record and convert audio signals into audio data as well as to convert and reproduce audio data into audio signals.

10. A device according to claim 1, wherein the device (1) comprises a radio means (17), adapted and configured to transmit the image data of the first camera (8) and the image data of the second camera (9) and particularly the audio data of the audio means as an electromagnetic radio signal, and particularly for receiving radio signals, particularly radio signals in which the audio data for the audio means are contained.

11. The device to claim 1, wherein the device (1) comprises of a global navigation system module, particularly a GPS module, a Galileo module and/or a GLONASS module, and/or a Bluetooth or WLAN-module, for near-field localization.

12. The device according to claim 1, wherein the device (1) comprises a SIM-card configured to send data traffic, in particular the image and audio data of the device, via a mobile data network.

13. A system for transmitting image and audio data, comprising:
    a device (1) according to claim 1;
    a server (200);
    a client (201);
wherein the server (200) is arranged and configured to receive, process and to transmit signals to the client (201), particularly radio signals of the device (1), such signals comprising image data, and wherein the server is further adapted and configured to establish a data communication between the device (1) and the client (201), and particularly to transmit audio data from the client (201) to the device (1).

14. The system according to claim 13, wherein the server (200) processes the radio signals of the device (1) into a data stream, containing three-dimensional image data from the image data of the first and the second cameras (8, 9).

\* \* \* \* \*